United States Patent
Aboutboul et al.

[15] 3,652,215
[45] Mar. 28, 1972

[54] PREPARATION OF SILICA GELS

[72] Inventors: Henri A. Aboutboul, Cincinnati, Ohio; William Kirch, Clinton, Iowa; Jerome H. Krekeler, Cincinnati, Ohio

[73] Assignee: National Petro Chemicals Company, Inc., New York, N.Y.

[22] Filed: Aug. 6, 1968

[21] Appl. No.: 750,734

[52] U.S. Cl. .................................. 23/182 R, 252/451 R
[51] Int. Cl. ............................................... C01b 32/16
[58] Field of Search ........................... 23/182; 252/451

[56] References Cited

UNITED STATES PATENTS

| | | | |
|---|---|---|---|
| 3,453,077 | 7/1969 | Hyde | 23/182 |
| 2,700,061 | 1/1955 | Owen | 23/182 X |
| 2,731,326 | 1/1956 | Alexander et al. | 23/182 |
| 2,763,533 | 9/1956 | Ashley et al. | 23/182 |
| 2,765,242 | 10/1956 | Alexander et al. | 23/182 X |
| 2,785,051 | 3/1957 | Miller | 23/182 |
| 3,041,140 | 6/1962 | Alexander | 23/182 |
| 3,081,154 | 3/1963 | Acker et al. | 23/182 |
| 3,337,299 | 8/1967 | Burke, Jr. | 23/182 |
| 3,367,742 | 2/1968 | Marotta et al. | 23/182 |
| 3,428,425 | 2/1969 | Marotta | 23/182 |
| 3,433,593 | 3/1969 | Reinhardt et al. | 23/182 |
| 2,699,376 | 1/1955 | Hay | 252/451 X |
| 3,403,109 | 9/1968 | Colgan et al. | 252/451 |

Primary Examiner—Edward Stern
Attorney—Allen A. Meyer, Jr.

[57] ABSTRACT

Silica xerogels having narrow pore diameter distribution in the range of 300–600 A. and surface areas in the range of from 200–500 m.$^2$/g., and process for preparing such silica xerogels comprising critically controlled steps of precipitation of the silica gel, heat aging the precipitated silica hydrogel slurry, washing the aged product with solutions of salts having a displacing effect on sodium, disintegrating the gel, displacing the water, drying the gel and calcining.

19 Claims, 4 Drawing Figures

PREPARATION OF SILICA GELS

BACKGROUND OF THE INVENTION

1. Field of the Invention

This invention relates to silica xerogels having a narrow pore diameter distribution in the pore diameter range of 300 – 600 A. and surface areas ranging from 200 – 500 m.$^2$/g. and to a process for preparing such silica xerogels.

2. Description of the Prior Art

Much of the technology in the area of silica gels involves the problem of making strong hard gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of erosion of equipment and suffer less degradation by abrasion and particle rupture.

The only silica gels thus far reported having suitable particle size and narrow particle size distribution for the purposes mentioned above are characterized by a maximum port volume of about 1.8 to 1.9 cm.$^3$/g. and surface of from about 250 – 350 m.$^2$/g. Silica gels having higher average pore diameters reported in the prior art have only been obtained as aerogels. Aerogels are subject to shrinking when they are wet due to coalescence of the ultimate particles. This produces a loss of porosity and makes the products unsatisfactory for certain uses, especially as polymerization catalysts.

SUMMARY OF THE INVENTION

The present invention provides silica xerogels having a narrow pore diameter distribution primarily in the range of 300 – 600 A., surface areas ranging from 200 to 500 m.$^2$/g. and stability at temperatures of up to about 2,000° F. in a fluidized bed. The invention further contemplates a process for preparing the foregoing silica xerogels which comprises the following steps 1. Precipitation of a silica gel by neutralization of aqueous $x$Na$_2$O.$y$SiO$_2$ with a strong acid, a weak acid such as CO$_2$, ion exchange resins, or by other suitable neutralization procedure, carried out in stoichiometic proportions under good agitation and in accordance with the following conditions:
   a. The SiO$_2$ concentration in the final slurry is between 5 and 12 percent by weight and preferably from about 8 to 9 percent,
   b. The neutralization medium is added at the rate of up to 40 percent of the needed amount in from 30 minutes to 120 minutes, and preferably about 60 minutes, and the remaining 60 percent of the amount in from about 20 to 90 minutes more, and preferably about 45 minutes more,
   c. The temperature during precipitation is maintained between about 0° and 10° C. and preferably at about 5° C., and
   d. The final pH of the precipitate is from 3 to 8 and preferably between about 6 and 7.

2. Heating the precipitated silica hydrogel slurry under the following conditions:
   a. A pH of from 3 to 8, and preferably between 5 and 7,
   b. A temperature between 50° C. and 100° C., and preferably about 90°C., and
   c. For a period of from 1 to 6 hours and preferably about 4 hours.

3. Washing the product with salts having a displacing effect on sodium so that the filtrate titrates less than 20 p.p.m. sodium concentration. Suitable salts include aluminum chloride or sulfate and ammonium chloride or nitrate. The displacing can also be accomplished by washing with a strong acid such as hydrochloric acid.

4. Comminuting and reducing the gel particle size by high shear mixing from step 3 to obtain particles having a mean diameter of less than about 200 microns and preferably in the range of from 30 to 150 microns.

5. Displacing the water from the gel by use of a surfactant, alcohol, acetone or other organic compound which can displace water and reduce the surface tension of the wetting agent in the pores, 6. Drying the gel, and 7. Calcining the product from step 6 at a temperature between 500° and 1,200° F., and preferably at about 1,000° F.

DETAILED DESCRIPTION OF THE INVENTION

The invention will now be described in greater detail with reference to specific examples which illustrate the criticality of process conditions in order to obtain a silica xerogel product having a narrow pore diameter distribution primarily in the range of 300 – 600 A., surface area in the range of 200 – 500 m.$^2$/g. and stability at temperatures up to 2,000° F. in a fluidized bed.

The properties of the silica xerogel obtained in accordance with the invention and particularly the porosity characteristics are discussed in terms of pore volume (PV), surface area (SA), average pore diameter (Av. PD), where Av. $PD = 4PV/SA$, and pore size distribution. Determinations of the values for the various properties are made by a nitrogen absorption-desorption technique well known in the art and described in detail in the literature. For example, descriptions of the nitrogen absorption-desorption procedure for evaluating porosity of silica gels are found in the Journal of the American Chemical Society, Volume 60, page 309 (1938), "Journal of Catalysis," Volume 2, page 111 (1955) and elsewhere.

In the following examples, Example I is a description of a preferred method for carrying out the process of the invention to obtain a silica xerogel of the stated characteristics. The remainder of the examples illustrate the criticality of various process conditions or describe suitable alternative procedures for obtaining the silica xerogels.

EXAMPLE I 10,080 g. of sodium silicate solution containing 28.7 percent SiO$_2$ and 8.9 percent of Na$_2$O was added to 12,720 g. of water and cooled to 5° C. under agitation.

11,200 g. of H$_2$SO$_4$ (12.75 wt. percent was then added as follows:
a. 4,480 g. was added at a constant rate over a period of 1 hour, and
b. the remainder was added over a period of 45 min.

The final pH of the precipitate was 6.2 and the SiO$_2$ content was approximately 8.5 percent.

The slurry was then heated to 95° C. and held at that temperature for 3 hours. The slurry was washed with a solution of 1,113 g. of NH$_4$NO$_3$ in 45 gal. of water, and then with deionized water until the filtrate titrated less than 20 p.p.m. Na$_2$SO$_4$.

The product was re-slurried in acetone and washed with acetone until the water in the acetone titrated less than 1.0 percent.

The product was then homogenized and the acetone distilled off to reduce the acetone content to less than 1 percent by weight.

The silica gel obtained was calcined in an oven at 1,000° F. for 4 hours before evaluation. The physical properties of the silica xerogel thus obtained were: $SA = 268$ m.$^2$/g., $PV = 2.52$ cm.$^3$/g., Av. $PD = 365$ A.

Figure 1:
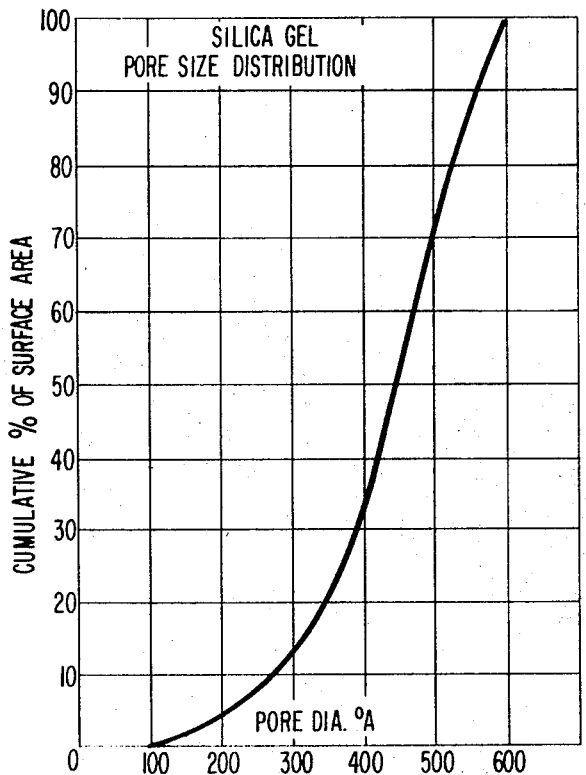

Referring to FIG. 1 of the drawing, it will be seen that the major portion of the cumulative surface area of the silica xerogel product is accounted for by gel having pore size distribution in the narrow range of from 300 to 600 A.

After calcination in a fluidized bed at 1,800° F. for 3 hours, the physical properties were unchanged: $SA = 278$ m.$^2$/g., $PV = 2.54$ cm.$^3$/g., Av. $PD = 365$ A.

EXAMPLE II

All of the variables during precipitation, except final SiO$_2$ concentration, were maintained as in Example I. Final SiO$_2$ concentrations of 7 percent and 10 percent were chosen and FIG. 2 shows the effect of $SiO_2$ concentration on the porosity of the gel just after precipitation.

Figure 2:
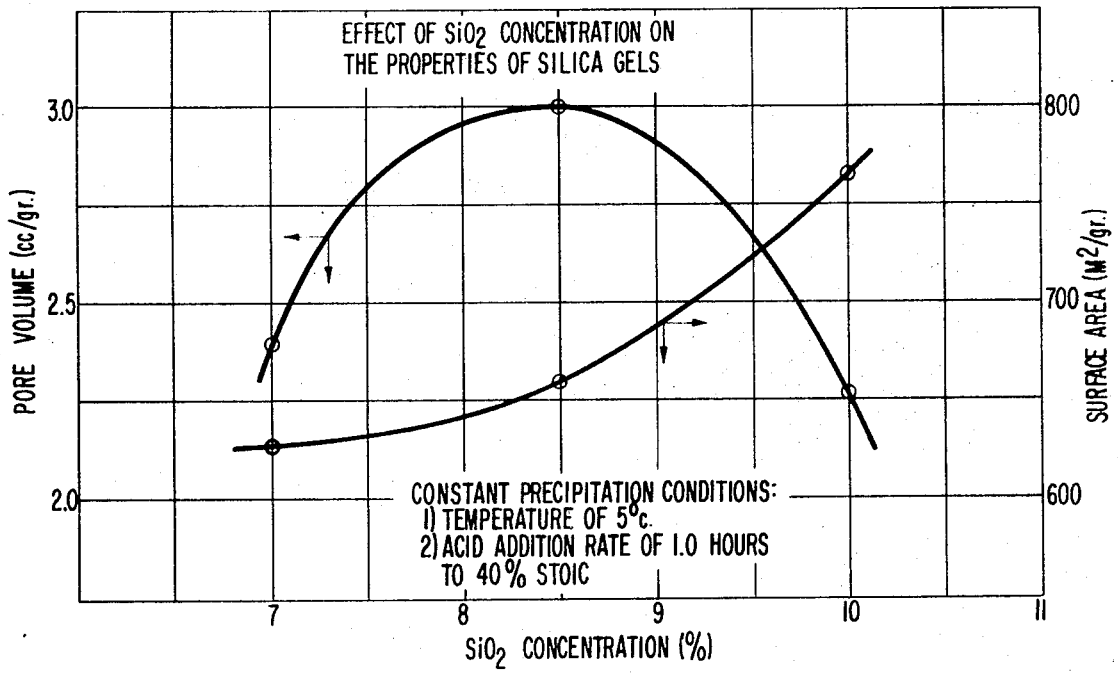

Referring to FIG. 2 of the drawing, it will be seen that relatively lower pore volumes are obtained where the final silica concentration in the slurry is 7 percent and 10 percent as compared with the pore volume obtained in Example I where an $SiO_2$ concentration of about 8.5 percent was obtained. FIG. 2 also demonstrates that the surface area increases as the $SiO_2$ concentration increases. Thus, in order to get maximum port volume and at the same time obtain a good surface area level it is preferable to maintain the $SiO_2$ concentration at between about 8 and 9 percent and most preferably at about 8.5 percent.

EXAMPLE III

All variables during precipitation, except the acid addition rate, were maintained as in Example I. The initial 40 percent of the stoichiometric acid requirement was added at constant rate in 0.5 and 2.0 hours as compared to 1.0 hours in Example I.

Figure 3:
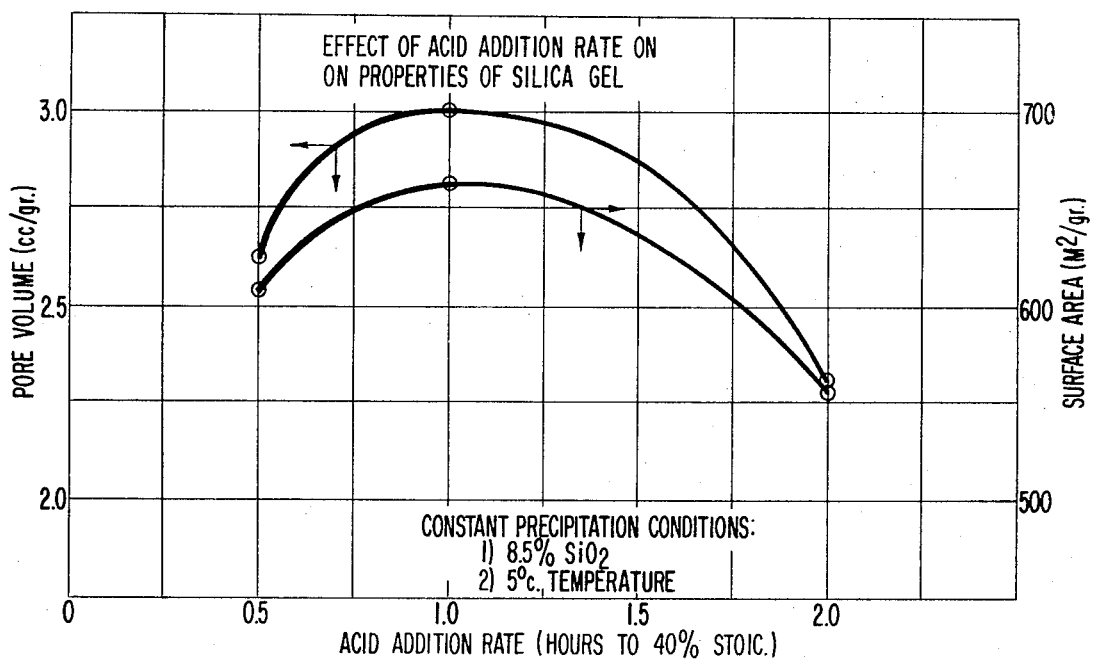

Example III clearly illustrates, as shown in FIG. 3 of the drawings, that both pore volume and surface area are dependent upon the rate at which the neutralizing medium, in this case the sulfuric acid, is added to the aqueous silicate solution. It will be seen that optimum pore volume and surface area values are obtained using an addition rate of about 1 hour for 40 percent of the stoichiometric amount and that lower values for pore volume and surface area are obtained where more rapid or slower addition rates are employed.

EXAMPLE IV

Figure 4:
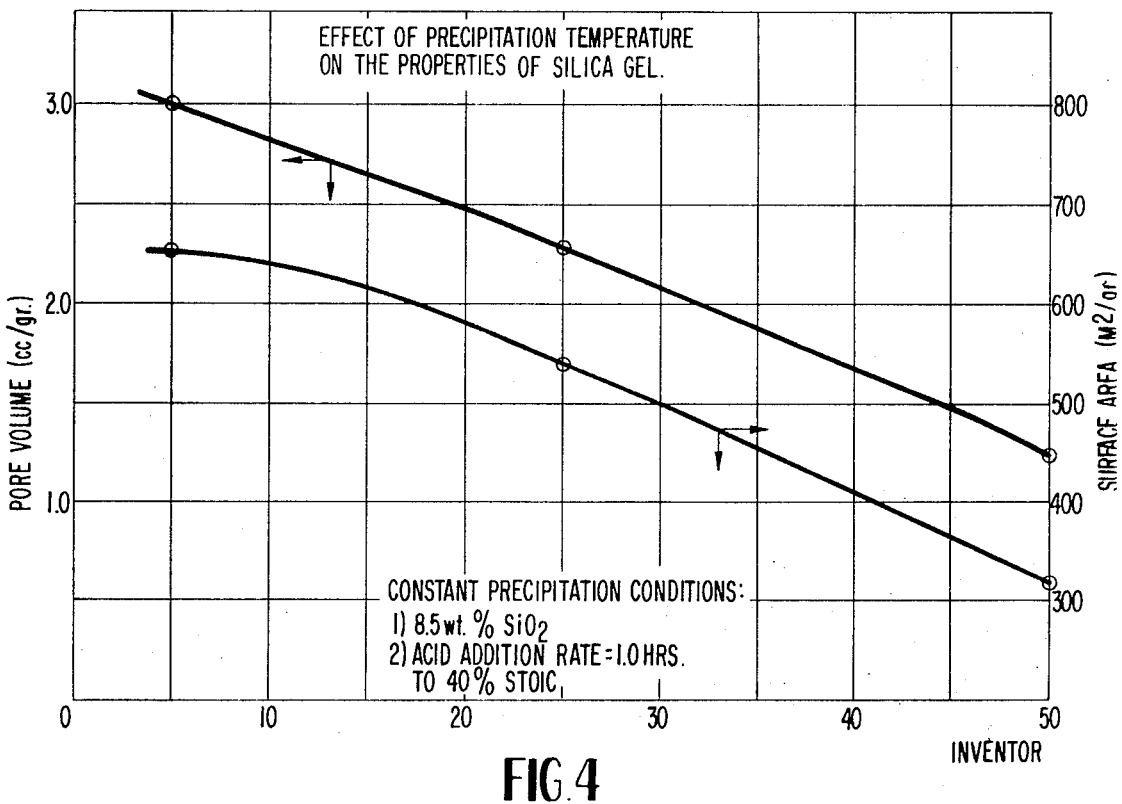

All variables during precipitation, except temperature, were maintained as in Example I. Temperatures of 25° C. and 50° C. were used during precipitation. Figure 4 shows the effect of temperature on the porosity of the gel just after precipitation.

As will be seen by reference to FIG. 4, the pore volume decreases as the precipitation temperature increases. Surface area also tends to decrease with an increase in the precipitation temperature, but this value flattens out at about 5° C. and this is the preferred temperature of precipitation in order to secure optimum values for pore volume and surface area.

EXAMPLE V

In this example all the variables during precipitation were maintained as in Example I, but $CO_2$ was used to neutralize the sodium silicate instead of sulfuric acid. The physical properties of the silica gel were similar to those obtained under Example I.

EXAMPLE VI

All the variables during precipitation were maintained the same as in Example I. After precipitation, the gel was adjusted to a pH of 9.0 by adding NaOH (2-normal) and was heated for 1 hour at 95° C. The gel was then washed with water and acetone as in Example I before evaluating it.

The properties of the silica gel were as follows: $SA = 346$ m.$^2$/g., $PV = 1.96$ cm.$^3$/g., and AV. $PD = 226$ A.

As will be seen by comparing the properties of the gel obtained in accordance with Example VI with the product of Example I, too high a pH and relatively brief heating during the aging step results in a loss of pore volume. The pore volume obtained in Example I was 2.52 cm.$^3$/g. as compared with only 1.96 cm.$^3$/g. for Example VI.

EXAMPLE VII

In this example, all the variables during precipitation were maintained in Example I. After precipitation, the gel was adjusted to a pH of 5.0 by adding $H_2SO_4$ (1-normal), and was heated to 95° C. for 4 hours. Samples were taken at various time intervals during the aging and were washed with water and then with acetone, as in Example I, before evaluation.

Table I shows the influence of the length of the thermal aging period on the porosity of the gel and on pore distribution:

TABLE I

| Time (Hrs.) | SA (m²/g.) | PV (cm³/g.) | Av. PD. (A.) |
|---|---|---|---|
| 0 | 757 | 2.77 | 147 |
| ½ | 492 | 2.72 | 221 |
| 1 | 394 | 2.90 | 294 |
| 1½ | 355 | 2.76 | 311 |
| 2 | 343 | 2.77 | 323 |
| 4 | 384 | 2.56 | 362 |

As will be seen from the data reported in Table I the thermal aging of the precipitate should be conducted for a minimum of about 1 hour in order to obtain a silica xerogel product having an average pore diameter in the desired range of about 300 – 600 A.

EXAMPLE VIII

In this example all the variables during precipitation and heating were maintained the same as in Example I. The gel was then washed as in Example I, but only until the filtrate titrated 100 p.p.m. $Na_2SO_4$. The product was then treated with acetone and evaluated. The physical properties of the gel were substantially the same as were found for the product of Example I. However, when the product was calcined in a fluidized bed at 1,825° F. for 3 hours and evaluated, the properties were as follows: $SA = 225$ m.$^2$/g., $PV = 1.62$ cm.$^3$/g., Av. $PD = 286$ A.

As will be seen from the porosity values of the product obtained in accordance with Example VIII when compared to the product of Example I after calcination in a fluidized bed at 1800° F., the surface area pore volume and average pore diameter are all adversely affected by the relatively high level of $Na_2SO_4$ left in the product.

EXAMPLE IX

All the variables during precipitation, heating and water washing were maintained as in Example I. The gel was washed with acetone until the water in the acetone titrated 5 percent. The acetone was then distilled off and the silica gel evaluated.

The physical properties were as follows: $SA = 248$ m.$^2$/g., $PV = 1.79$ cm.$^2$/g. and Av. $PD = 289$ A.

The product obtained in accordance with Example IX is also adversely affected in terms of surface area, pore volume and average pore diameter by the failure to reduce the water volume in the gel by replacement with acetone to a value of less than about 1 percent by weight as was achieved in Example I.

What is claimed is:

1. A method for producing a silica xerogel having a narrow pore size distribution primarily within the range of 300–600 A., a surface area within the range of 200–500 m.$^2$/g. and stability at temperatures up to about 2,000° F. in a fluidized bed, comprising:

a. precipitating a silica hydrogel by neutralization of an aqueous solution of sodium silicate to provide a silica hydrogel slurry having an $SiO_2$ concentration of about 5 to 12 percent by weight and a pH of about 3 to 8, the temperature during precipitation being maintained between 0° and 10° C., the neutralization medium being added at the rate of up to 40 percent of the stoichiometric amount within from 30 to 120 minutes and the remaining amount of such medium being added within from about 20 to 90 additional minutes, b. heating the product of step a at a pH of about 3 to 8 and at a temperature of about 50° to 100° C. for about 1 to 6 hours, c. washing the product of step *b* to reduce the sodium ion concentration of the product of step *b* such that the filtrate titrates less than about 20 p.p.m., d. comminuting the product of step *c* by high shear mixing to reduce the size of the hydrogel particles to a mean diameter of less than about 200 microns, e. displacing the water from the product of step *d* by washing the product of step *d* with a water-miscible organic liquid capable of replacing water and reducing the surface tension in the pores of the gel, so as to reduce the amount of water in the gel to a level such that it titrates less than 1 percent by weight in the organic wash liquid, f. drying the product of step *e* to remove said organic liquid.

2. The method of claim 1 wherein the precipitation of silica hydrogel in step *a* is accomplished by neutralization of the aqueous solution of sodium silicate with an agent selected from the group consisting of a strong acid, a weak acid, and an ion-exchange resin.

3. The method of claim 2 wherein the precipitation of silica hydrogel in step *a* is accomplished by neutralizing with a strong acid 40 percent of said acid necessary for neutralization being added over a period of 30 to 120 minutes and the balance being added during a subsequent period of about 20 minutes to 90 minutes.

4. The method of claim 1 wherein the $SiO_2$ concentration in the hydrogel precipitate of step *a* is about 8 to 9 percent by weight.

5. The method of claim 1 wherein the temperature during neutralization step *a* is about 5° C.

6. The method of claim 1 wherein the pH of the hydrogel precipitation in step *a* is adjusted to about 5 to 6.

7. The method of claim 1 wherein pH of the slurry in step *b* is about 5 to 6.

8. The method of claim 1 wherein the temperature of the slurry during step *b* is about 90° C.

9. The method of claim 1 wherein the time of step *b* is about 4 hours.

10. The method of claim 1 wherein the reduction of concentration of sodium ions is accomplished by washing with a solution of displacing salts.

11. The method of claim 10 wherein said salts are selected from the group consisting of aluminum chloride, aluminum sulfate, ammonium chloride, ammonium nitrate or mixtures thereof.

12. The method of claim 1 wherein step *c* is accomplished by washing with a solution of a strong acid.

13. The method of claim 12 wherein said acid is selected from the group consisting of HCl and $H_2SO_4$.

14. The method of claim 1 wherein the organic liquid in step *e* is selected from the group consisting of lower aliphatic alcohols, acetone, and mixtures thereof.

15. The method of claim 1 wherein step *f* is accomplished by spray drying.

16. The method of claim 1 wherein step *f* is accomplished by distillation.

17. The method of claim 1 further comprising calcining the product of step *f* at a temperature in the range of about 500° F. to 1,200° F.

18. A method for producing a silica xerogel having a narrow pore size distribution primarily within the range of 300–600 A., a surface area within the range of 200–500 m.$^2$/g. and stability at temperatures up to about 2,000° F. in a fluidized bed, comprising:

a. precipitating a silica hydrogel by neutralization of an aqueous solution of sodium silicate to provide a silica hydrogel slurry having an $SiO_2$ concentration of about 8 to 9 percent by weight, the temperature during precipitation being maintained at about 5° C., and the pH of the precipitate being maintained at about 5 to 6, the neutralization medium being added at the rate of up to 40 percent of the stoichiometric amount within 30 to 120 minutes and the remaining amount of such medium being added within about 20 to 90 additional minutes, b. heating the product of step *a* at a temperature of about 90° C. for 4 hours, c. washing the product of step *b* to reduce the sodium concentration, measured as $Na_2SO_4$, so that the filtrate from the washing titrates less than 20 p.p.m. of sodium, d. disintegrating the product of step *c* by high shear mixing to reduce the size of the hydrogel particles to a mean diameter in the range of 30 to 150 microns, e. displacing the water from the product of step *e* by replacement with a water-miscible organic liquid to reduce the surface tension within the pores of the gel so that the water in the organic liquid titrates at less than about 1 percent, f. drying the product of step *e* to remove said organic liquid.

19. A method for producing a silica xerogel having a narrow pore size distribution primarily within the range of 300–600 A., a surface area within the range of 200–500 m.$^2$/g. and stability at temperatures up to about 2,000° F. in a fluidized bed, comprising:

a. precipitating a silica hydrogel by neutralization of an aqueous solution of sodium silicate to provide a silica hydrogel slurry having an $SiO_2$ concentration of about 5 to 12 percent and a pH of about 3 to 8, the temperature during precipitation being maintained between 0° and 10° C., the neutralization medium being added at the rate of up to 40 percent of the stoichiometric amount within 30 to 120 minutes and the remaining amount of such medium being added within about 20 to 90 additional minutes, b. heating the product of step *a* at a pH of about 3 to 8 and at a temperature of about 50° to 100° C. for about 1 to 6 hours, c. washing the product of step *b* to reduce the sodium ion concentration of the product of step *b* such that the filtrate titrates less than about 20 p.p.m., d. displacing the water from the product of step *c* by washing the product of step *c* with a water-miscible organic liquid capable of replacing water and reducing the surface tension in the pores of the gel, so as to reduce the amount of water in the gel to a level such that it titrates less than 1 percent by weight in the organic wash liquid, e. comminuting the product of step *d* by high shear mixing to reduce the size of the hydrogel particles to a mean diameter of less than about 200 microns, f. drying the product of step *e* to remove said organic liquid.

* * * * *